April 14, 1925. 1,533,672
J. O. STOCKSTILL
BEET HARVESTER
Filed July 27, 1923 3 Sheets-Sheet 3
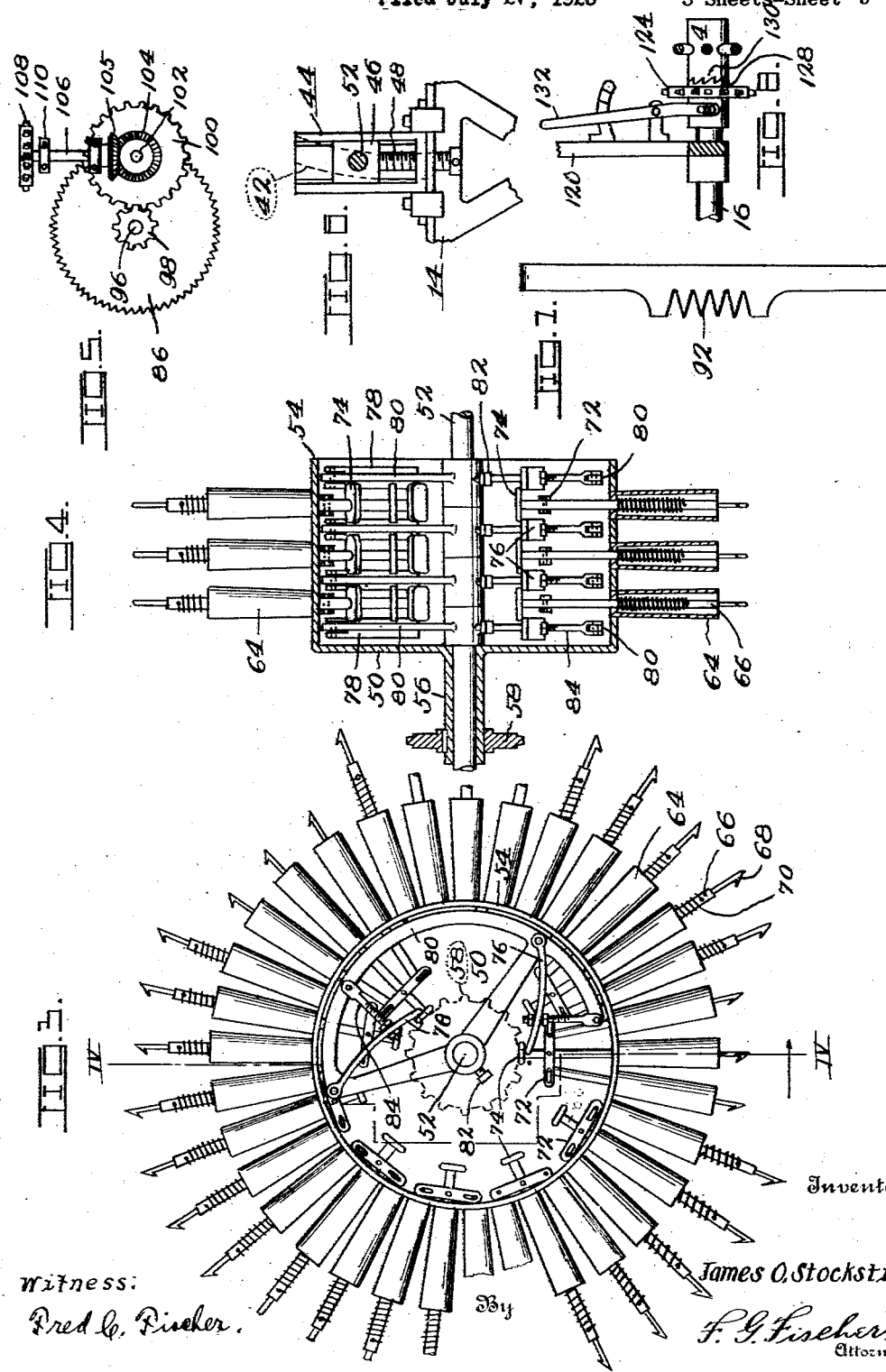

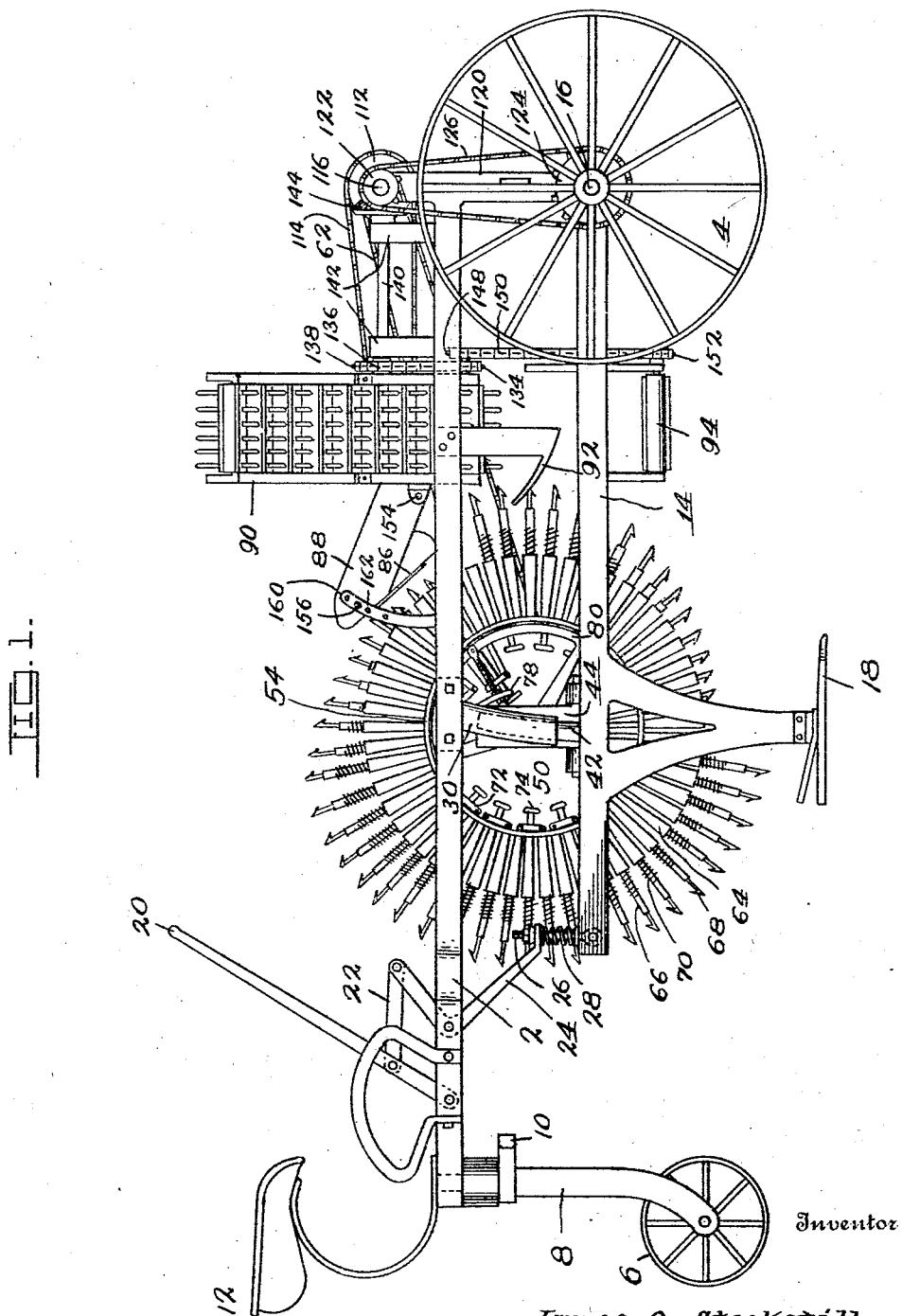

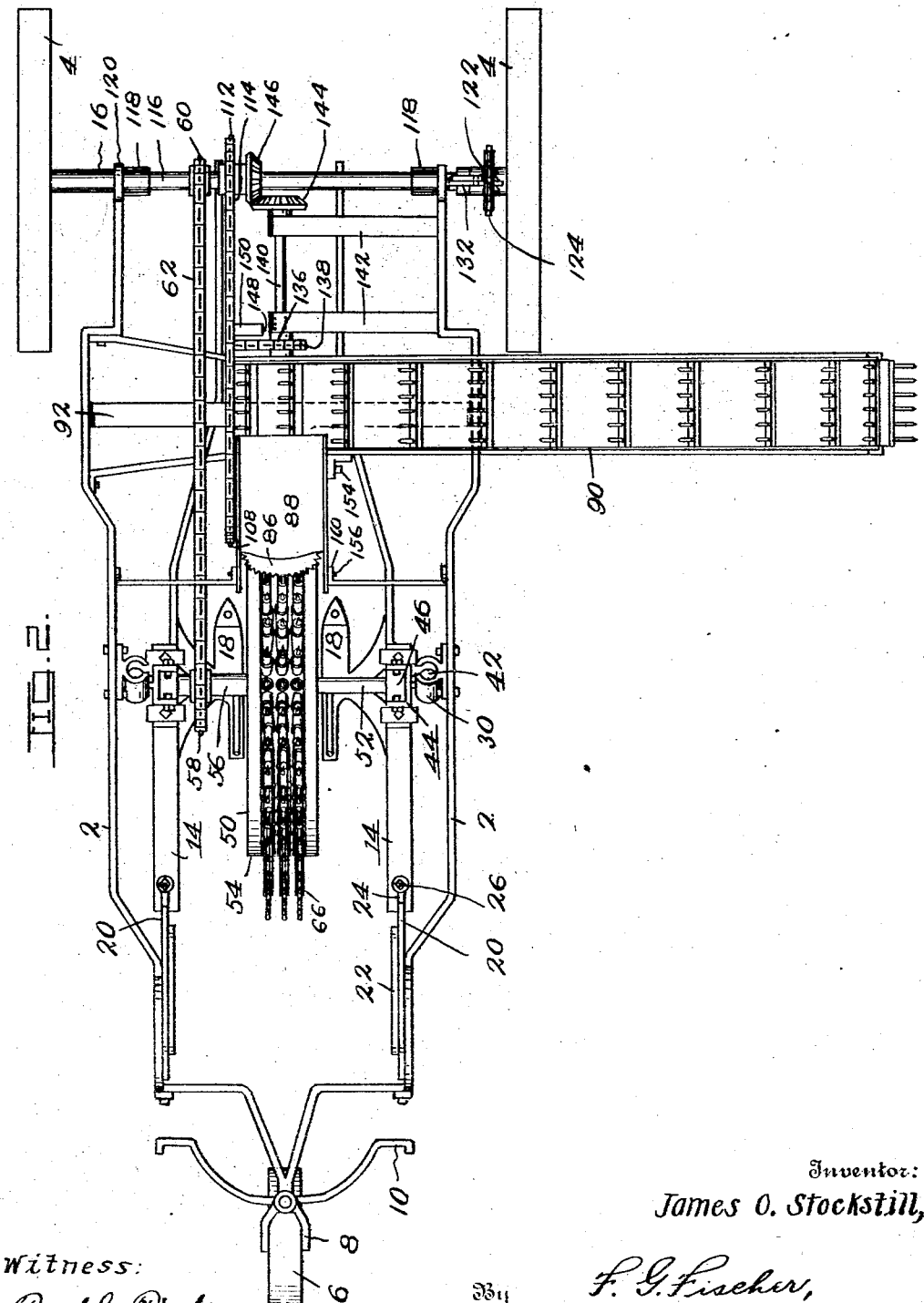

Patented Apr. 14, 1925.

1,533,672

UNITED STATES PATENT OFFICE.

JAMES O. STOCKSTILL, OF ROCKY FORD, COLORADO.

BEET HARVESTER.

Application filed July 27, 1923. Serial No. 654,128.

*To all whom it may concern:*

Be it known that I, JAMES O. STOCKSTILL, a citizen of the United States, residing at Rocky Ford, in the county of Otero and State of Colorado, have invented certain new and useful Improvements in Beet Harvesters, of which the following is a specification.

My invention relates to machines for harvesting and topping beets, and embodies means for loosening the beets from the soil; means for raising the beets from the soil; means for topping the beets while in raised position; means for elevating the topped beets into a wagon driven beside the harvester; and means for depositing the beet tops upon the ground over which the harvester has already passed.

An important feature of the invention resides in rotary pick-up mechanism which picks the beets up from the ground and carries them to cutter means whereby the tops are severed from the beets, said pick-up mechanism and the cutter means being arranged to cut the tops off at a uniform depth, thereby avoiding the waste which often occurs when topping the beets while in the ground, due to the fact that the beets are of different sizes and extend to different levels in and out of the ground.

Other features will hereinafter appear, and in order that the invention may be fully understood, reference will now be had to the accompanying drawings, in which:

Fig. 1 is a side elevation of the harvester.

Fig. 2 is a plan view of the harvester with the seat removed.

Fig. 3 is a detail side elevation of the rotary mechanism for picking up the beets after they have been loosened from the ground.

Fig. 4 is a vertical section on line IV—IV of Fig. 3.

Fig. 5 is a detail plan view of the beet topping knife and its driving mechanism.

Fig. 6 is a fragmentary side elevation of means for adjusting the beet pick-up mechanism vertically.

Fig. 7 is a broken detail plan view of a comb for stripping the severed beet tops from the rotary pick-up mechanism.

Fig. 8 is a detail sectional view of a clutch through which the several parts are driven by one of the ground wheels of the harvester.

Referring now in detail to the various parts, 2 designates the main frame which is mounted upon front wheels 4 and a rear steering wheel 6, the yoke 8 of which is provided with oppositely-projecting foot rests 10 whereby the wheel 6 may be turned to the right or left for the purpose of steering the harvester. The foot rests 10 are within convenient reach of the operator's seat 12.

14 designates two plow beams pivotally mounted at their forward ends upon the front axle 16 upon which the front wheels 4 are mounted. The plow beams 14 are provided near their rear portions with suitable plows 18 which loosen and raise the beets to the surface of the ground, where they can be gathered by the rotary pick-up mechanism hereafter described.

The plow beams 14 are lowered and raised to adjust the plows 18 in and out of the ground by hand levers 20, links 22, bell-cranks 24 and rods 26. The hand levers 20 and bell-cranks 24 are pivotally connected to the opposite sides of the rear portion of the main frame 2, while the rods 26 are adjustably connected at their upper ends to the bell-cranks 24 and pivotally connected at their lower ends to the plow beams 14. Coil springs 28 are interposed between the lower ends of the bell-cranks 24 and the plow beams 14 to permit the latter to yield and move upwardly in case the plows 18 meet with an obstruction in the ground.

In order to relieve the plow beam raising and lowering mechanism above described, of lateral stresses, the plow beams 14 are connected to the main frame 2 through the intermediacy of arcuate slideways 30 and arcuate members 42, the centers of which are struck from the axle 16, so that there will be no binding between the slideways 30 and the members 42 when the plow beams 14 are raised and lowered. The slideways 30 are firmly secured to the sides of the main frame 2, while the members 42 are fixed to vertical slideways 44 secured to the tops of the plow beams 14 and provided with bearings 46 adapted to be adjusted vertically by set screws 48 threaded through the lower ends of the vertical slideways 44, Fig. 6.

Referring now more particularly to the rotary mechanism for picking up the beets from the ground, Figs. 3 and 4, 50 designates a rotary member mounted upon a stationary shaft 52 fixed in the bearings 46. The rotary member 50 embodies a peripheral flange 54 and a tubular shaft 56, which latter is journaled upon the stationary shaft 52 and provided with a fixedly-mounted sprocket wheel 58 driven from a sprocket wheel 60 through the intermediacy of an endless sprocket chain 62.

The flange 54 is provided with a number of circular rows of tubes 64 through which rods 66 extend. The rods 66 are provided at their outer ends with barbs 68 and are normally pressed outwardly by coil springs 70. In the present instance the rods 66 are connected in groups of three by yokes 72 which are normally held by the springs 70 against the inner surface of the circular flange 54. The central rod 66 of each group extends inwardly beyond the associate yoke 72 and is provided with a knob 74, which travels under a pair of arms 76 and over a pair of similar arms 78 to draw the rods 66 of the associate group inwardly as best shown by Fig. 3.

Each pair of arms 76 and 78 is pivotally connected to an associate segment 80 fixed to the stationary shaft 52 through suitable means such as a set screw 82. The inner ends of the arms 76 and 78 are adjustably connected to threaded rods 84 pivotally connected at their outer ends to the segment 80. The arms 76 are so disposed as to release the rods 66 after the same have approached the ground, the rods 66 of each group being, preferably, released after passing a vertical line extending centrally through the axis of the shaft 52. As the groups of rods 66 are successively released by their associate knobs 74 passing off the arms 76 the springs 70 forcibly throw said rods 66 outwardly, causing the barbs 68 to enter the tops of the loosened beets and carry the same upwardly to the beet topping means consisting in the present instance of a rotary cutter 86.

As the rods 66 carrying the beets approach the cutter 86 said rods are drawn inwardly by the associate knobs 74 traveling downwardly under the arms 78, thereby insuring the passage of the barbs 68 within a given distance of the cutter 86. The foregoing also insures cutting the tops off the beets at a uniform depth because the rods 66 are withdrawn to the same degree from the beets as the tops thereof are pulled against the ends of the tubes 64.

As the tops are severed from the beets the latter fall into a chute 88, Figs. 1 and 2, and are conducted thereby to the lower portion of an endless elevator 90, whereby the beets are carried upwardly and discharged upon the ground or into a wagon driven beside said elevator, while the beet tops are carried down to a comb 92 which strips said tops from the barbs 68 and deposits them upon an endless conveyer 94, whereby they are discharged upon the ground already passed over by the harvester.

The rotary cutter 86 is mounted upon a stub shaft 96, Fig. 5, journaled in a suitable bearing on the bottom of the chute 88. Said shaft 96 is driven by a small gear 98 intermeshing with a larger gear 100 mounted on a shaft 102 provided with a fixedly mounted bevel gear 104, intermeshing with a bevel gear 105 fixed upon one end of a shaft 106 provided at its opposite end with a fixedly mounted sprocket wheel 108. The shaft 102 is mounted in a bearing fixed to the bottom of the chute 88, while the shaft 106 is journaled in bearings 110 also secured to the bottom of said chute 88. The sprocket gear 108 is driven from a sprocket gear 112 through the intermediacy of an endless sprocket chain 114.

The sprocket wheels 60 and 112 are fixedly mounted upon a shaft 116 journaled in bearings 118 at the upper ends of standards 120 on the main frame 2. The shaft 116 is provided at one end with a sprocket wheel 122 driven by a sprocket wheel 124 through the intermediacy of an endless chain 126. The sprocket wheel 124 is loosely mounted upon the axle 16 and has a clutch member 128 for engagement with a companion clutch member 130 on the hub of the adjacent wheel 4. A lever 132 is provided for shifting the sprocket wheel 124 laterally to cause its clutch 128 to engage and disengage the clutch member 130.

The lower shaft of the elevator 90 is provided with a sprocket wheel 134 connected by an endless sprocket chain 136 to a sprocket wheel 138 fixed upon one end of a counter shaft 140 journaled in bearings 142. The countershaft 140 is provided at its opposite end with a bevel gear 144 driven by a bevel gear 146 fixed upon the shaft 116. The endless conveyer 94 is driven from the lower shaft of the elevator 90 by a sprocket wheel 148, an endless sprocket chain 150, and a sprocket wheel 152. The elevator 90 is supported by the main frame 2, while the conveyer 94 is supported from the plow beams 14.

The chute 88 is connected by pivots 154 to the adjacent side-board of the elevator 90 and its free end is adjustably supported by bolts 156 and arcuate arms 160 provided with holes 162 to receive said bolts 156 and secured to the main frame 2. By thus adjustably supporting the chute 88 the rotary cutter 86 may be adjusted into proper relation with the rotary pick-up mechanism above described, which in turn is adjusted into proper relation with the plows 18 through the intermediacy of the set screws 48.

Any suitable draft mechanism, not shown, may be provided whereby the harvester may be drawn either by team or tractor.

The operation briefly stated is as follows: As the harvester advances through the field with the plows 18 at each side of a row of beets, said plows loosen the beets from the ground and raise them to within reach of the barbs 68 of the rotary pick-up mechanism which carries the beets upwardly to the rotary cutter 86, where the tops are severed from the beets. The beets are then conducted by the chute 88 to the elevator 90, which delivers them upon the ground or into a wagon. The tops are stripped from the barbs 68 by the conveyer 92, which discharges said tops upon the ground from which the beets have been harvested.

From the foregoing description it is apparent that I have produced a harvester embodying the advantages above pointed out, and while I have shown and described the preferred construction and arrangement of parts, I reserve the right to make such changes as properly fall within the spirit and scope of the claims.

Having thus described my invention, what I claim and desire to secure by Letters Patent, is:

1. In a beet harvester, a rotary member, tubes radiating from said rotary member, and means yieldably mounted in said tubes for picking up beets from the ground.

2. In a beet harvester, a rotary member, tubes radiating from said rotary member, and rods yieldably mounted in said tubes and provided with means for picking up beets from the ground.

3. In a beet harvester, a rotary member, tubes radiating from said rotary member, rods extending through said tubes and adapted to pick up beets from the ground, an arm for lifting said rods as they approach the ground at each revolution, and springs for forcibly throwing the rods downwardly when released from said arm.

4. In a beet harvester, a rotary member, tubes radiating from said rotary member, rods extending through said tubes and adapted to pick up beets from the ground, an arm for lifting said rods as they approach the ground at each revolution, means for adjusting said arm up or down, and springs for forcibly throwing the rods downwardly when released from said arm.

5. In a beet harvester, a rotary member, tubes radiating from said rotary member, rods extending through said tubes and adapted to pick up beets from the ground, means connecting said rods in groups, arms engaged by one of each group of rods for lifting said group as it approaches the ground during each revolution, and means for forcing each group downwardly when released from said arms.

6. In a beet harvester, a rotary member, tubes radiating from said rotary member, means yieldably mounted in said tubes for picking up beets from the ground, and cutting means arranged in the path of the beets for severing the same from their tops.

7. In a beet harvester, a rotary member, tubes radiating from said rotary member, means yieldably mounted in said tubes for picking up beets from the ground, means for topping the beets, and means for drawing in said beet pick-up means to a predetermined point as they approach the beet topping means.

8. In a beet harvester, a rotary member, tubes radiating from said rotary member, means yieldably mounted in said tubes for picking up beets from the ground, means for topping the beets, and an arm for drawing in the beet pick-up means as they approach the beet topping means.

In testimony whereof I affix my signature in the presence of two witnesses.

JAMES O. STOCKSTILL.

Witnesses:
L. J. FISCHER,
F. C. FISCHER.